United States Patent Office 2,796,382
Patented June 18, 1957

2,796,382

SELECTIVE OXIDO-REDUCTION OF β-HYDROXY AND KETOSTEROIDS CONTAINING 3 BETA GROUPS AND 17 BETA GROUPS

Paul Talalay, Chicago, Ill.

No Drawing. Application October 9, 1953,
Serial No. 385,304

17 Claims. (Cl. 195—51)

(Granted under Title 35, U. S. Code (1952), sec. 266)

The invention described herein may be manufactured and used by or for the Government of the United States for governmental purposes without the payment to me of any royalty thereon in accordance with the provisions of the act of April 30, 1928 (ch. 460, 45 Stat. L. 467), 35 U. S. C. 266.

This invention relates to the chemical transformation of steroids and, more particularly, to the reversible oxidations and reductions of hydroxyl or keto groups on the cyclopentanopolyhydrophenanthrene nucleus by means of enzymes obtained from microorganisms.

An object of this invention is to provide a method for the selective interconversion of hydroxy and keto groups at specific positions on the steroid molecule.

Another object of this invention is to provide a method for performing stereochemically oriented reactions at a specific position on a steroid molecule.

Another object of this invention is to provide a method for the selective interconversion of beta hydroxy and keto groups at the 3 and 17 positions on a steroid molecule.

Another object of this invention is to provide a method for the selective interconversion of beta hydroxy and keto groups at the 3 and 17 positions on a steroid molecule without effect upon unprotected groups at other positions on the molecule.

Another object of this invention is to provide a method for the reduction of ketosteroids to a selected beta hydroxysteroid under mild reaction conditions and in high yield.

Another object of this invention is to provide a method for the oxidation of beta-hydroxysteroids to a selected keto-steroid under mild reaction conditions and in high yields.

These and other objects of the invention, which will become apparent as the ensuing description proceeds, are accomplished by subjecting the selected steroid to the action of a particular adaptive enzyme, hereinafter designated for convenience as "Beta-hydroxysteroid dehydrogenase," in a suitable medium and in the presence of a "hydrogen carrier." It has been found that this enzyme in an alkaline medium in the presence of a hydrogen acceptor will selectively convert beta hydroxy groups at the 3 and 17 positions of a steroid nucleus to corresponding keto groups. Conversely, keto groups at the 3 and 17 positions are selectively converted by this enzyme in presence of a hydrogen donor under acid conditions to beta hydroxy groups. The conversion from keto to beta-hydroxy occurs much more rapidly at the 17 position than at the 3 position. The presence of keto or hydroxy groups at other positions on the steroid molecule has no inhibiting effect upon the reaction and these groups remain unattacked even though unprotected.

The steroids operative in the method of the present invention are not limited as to type or number of substituents and for operativeness in the process need only contain Beta-hydroxyl or keto groups at one or at both of the 3 and 17 positions. The cyclopentanopolyhydrophenanthrene nucleus may contain additional substituents or combinations of substituents as in the 1, 2, 4, 5, 6, 7, 8, 9, 10, 11, 12, 13, 14, 15, and 16 positions or in the instance in which the reactive group is only at the 17 or at the 3 position the remaining 17 or 3 position may contain a substituent. The nucleus, for example, may contain 10–13 dimethyl groups, or a side chain at the 17 position such as a methyl or acetyl group, and the like. The nuclear skeleton may be saturated as in the androstane or etiocholane series; or it may be unsaturated at one or more positions especially 4 and 5, or may contain multiple double bonds in ring A.

Illustrative oxidations which have been carried out in alkaline medium in the presence of "Beta hydroxysteroid dehydrogenase" and a hydrogen acceptor are as follows:

(1) Testosterone⇌androst-4-ene-3,17-dione
(2) Dehydroepiandrosterone→androst-4-ene-3,17-dione
(3) Androst-5-ene-3β,17β-diol→androst-4-ene-3,17-dione
(4) methylandrost-5-ene-3β,17β-diol→
    17α-methyl testosterone
(5) 11α-hydroxy testostrone⇌
    11α-hydroxy androst-4-ene-3,17-dione
(6) 11β-hydroxy testosterone⇌
    11β-hydroxy androst-4-ene-3,17-dione
(7) 6β-hydroxy testosterone⇌
    6β-hydroxy androst-4-ene-3,17-dione
(8) Androst-5-ene-3β,17α-diol→
    androst-4-en-17α-ol-3-one
(9) Androst-5-ene-3α,17β-diol⇌
    androst-5-en-3α-ol,17-one
(10) Androstan-17β-ol⇌androstan-17-one
(11) Androstan-3β-ol⇌androstan-3-one
(12) Androstan-17β-ol-3-one⇌androstane-3,17-dione
(13) Androstan-3β-ol,17-one⇌androstane-3,17-dione
(14) Androstane-3β,17β-diol→androstane-3,17-dione
(15) Eticholan-17β-ol-3-one⇌etiocholane-3,17-dione
(16) 17β-estradiol⇌estrone
(17) 5-pregnen-3β-ol-20-one→progesterone Reactions 1 through 11 are illustrative of oxidations in the androstene series, Reactions 12 through 14 in the androstane series, Reaction 15 in the etiocholane series, Reaction 16 in the estrogen series and Reaction 17 in the progesterone series, respectively.

Illustrative reductions of 17 keto steroids carried out in acid medium in the presence of "Beta hydroxysteroid dehydrogenase" and a hydrogen donor are:

(18) Androsterone⇌androstan-3α-ol-17β-ol
(19) Androst-4-ene-3,17-dione⇌testosterone
(20) Androstan-17-one⇌androstan-17β-ol
(21) Epiandrosterone⇌androstane-3β,17β-diol
(22) Dehydroepiandrosterone→
    androst-5-ene-3β,17β-diol The enzyme, designated herein as "beta hydroxysteroid dehydrogenase," which is capable of performing these selective transformations may be produced by the growth of certain species of microorganisms of the genus Pseudomonas on 19-carbon steroids, such as testosterone, dehydroepiandrosterone, andros-4-ene-3,17-dione and related 19-carbon steroids. The microorganism is identified as *Pseudomonas testosteroni*, American Type Culture Collection No. 11,996. These microorganisms, which have been classified as a species of Pseudomonas hitherto undescribed in the present manuals of bacterial classification, are characterized by their ability to grow on steroids as their sole source of carbon and energy. They appear to be gram negative, unpigmented, non-spore-forming, highly motile, polarly flagellated, monotrichrous, unbranched rods. The Pseudomonas may be isolated from soil by enrichment culture technique and the enzyme content increased many times by either growing the microorganisms in the presence of steroids, by permitting "resting cell" suspensions of the microorganisms to oxidize steroids in vitro, or by multiple subcultures on steroid containing media to produce mutations of the parent strain, in which the enzymes have become at least in part constitutive. From such adapted Pseudomonas the enzyme "beta hydroxysteroid dehydrogenase" may be extracted by methods well known to the art of bacterial enzymology. Sonic or supersonic disintegration, grinding with glass, alumina, and drying the cells, have been successfully employed. From these cell-free extracts, purification of the enzymes to any desired degree can be achieved by well-known methods. It will be understood that either the crude extract or a purified extract of the enzyme "beta hydroxysteroid dehydrogenase" may be used to perform the selective reversible oxido-reduction of beta-hydroxy or keto groups at carbons 3 and 17. The method of producing the selective enzyme is more fully described in an article by Talalay et al. entitled "Purification and properties of a beta-hydroxy steroid dehydrogenase" in the Journal of Biological Chemistry (in press), 1953.

The biological hydrogen acceptor or donor, broadly termed "hydrogen carrier," utilized in carrying out the oxidation of the hydroxy-steroids or the reduction of the keto-steroids, respectively, in accordance with this invention is diphosphopyridine nucleotide (coenzyme 1, cozymase) or reduced diphosphopyridine nucleotide, as the case may be. Since the biological hydrogen carrier, hereinafter designated as DPN, is expensive, a number of expedients may be employed in large-scale conversions whereby the process is made practical. For example, a crude extract of yeast may be used as a source of DPN. As a further saving, trace or catalytic amounts of DPN may be employed and a reduction-oxidation dye, such as 2,6 dichlorophenol-indophenol may be used as the ultimate hydrogen acceptor or donor. Other hydrogen carriers such as methylene blue, quinone, and the like may be used in similar capacity. If the coupled dye is autooxidizable, the reduced DPN may be continuously regenerated by the atmospheric oxidation of the reduced dye.

While applicant is not limited by the theory of the reaction, the conversion appears to take place in the manner illustrated by the following equations:

Testosterone+DPN
$\rightleftharpoons$ 4-androstene-3,17-dione+DPNH+H$^+$
Dehydroepiandrosterone+DPN
$\rightleftharpoons$ 4-androstene-3,17-dione+DPNH+H$^+$
5-androstene-3$\beta$,17$\beta$-diol+2DPN
$\rightleftharpoons$ 4-androstene-3,17-dione+2DPNH+2H$^+$ By mass action considerations, it can be seen that the equilibrium of conversion can be shifted toward oxidation or reduction by adjusting the concentrations of suitable reactants. Thus, testosterone can be quantitatively converted to androst-4-ene-3,17-dione at pH 9, whereas at pH 6 the reverse reaction is favored.

The effect of pH on the reversible interconversion of testosterone and androst-4-ene-3,17 dione is illustrated by the following table:

Table

| pH | Percent Testosterone | Percent Androst-4-ene-3,17-Dione |
|---|---|---|
| 5.5 | 99 | |
| 6.6 | 90 | 10 |
| 7.4 | 50 | 50 |
| 8.3 | 10 | 90 |
| 9.0 | | 99 |

From the above table it may be seen that at pH above 8.3 the substantial quantitative conversion of testosterone to androst-4-ene-3,17 dione is effected, i. e., the 17 beta hydroxy group on the cyclo-pentanopoly-hydrophenanthrene nucleus has been quantitatively oxidized to the 17 keto group. On the other hand, at pH below about 6.6 the conversion is substantially quantitative in the other direction, i. e., reduction of the 17 keto group to the 17 beta hydroxy group. The keto group at the 3 position is slowly reduced and remains substantially uneffected during the period required to reduce the 17-keto group to 17 beta hydroxy. However, longer reaction periods may be employed, if desired, to also reduce the 3 keto group. While a pH below 5.5 may be used for the reduction reaction and a pH above 9.0 may be used for the oxidation, no advantage is derived from so doing and it is preferable to avoid the extreme pH conditions. The oxidation and reduction of other reactable steroids by "beta hydroxysteroid dehydrogenase" are similarly effected by the pH condition.

The reaction temperature is desirably maintained within the limits of from about 20° C. to about 35° C., room temperature usually being adequate. It will be noted that extreme temperatures and rigid temperature regulation are not required in effecting the desired conversions.

The conversion time is relatively short, compared to the time required in many bacterial conversions heretofore employed, with twenty minutes to an hour usually sufficing for conversions involving testosterone. Conversions of other steroids proceed at a somewhat slower rate but still at a rate comparatively high as compared with other bacterial conversions.

The invention will be further illustrated by the following examples of practice:

Example 1.—Pseudomonas cells are grown in liquid culture on a medium containing 5 grams per liter of yeast extract and .25 gram per liter of dehydroepiandrosterone in a medium containing inorganic nitrogen and mineral salts. Growth takes place at 30°. At the end of 12 hours the cells are harvested by centrifugation and the enzyme extracted from them by grinding with alumina. The completely cell-free extracts are subjected to enzyme purification by ammonium sulfate precipitation in suitable concentrations. The resulting purified extract of "beta hydroxysteroid dehydrogenase" was used for steroid conversions as set forth in the following examples.

Example 2.—300 micrograms of testosterone were dissolved in 10 ml. of 0.03 M phosphate buffer, pH 8.4, 1.4 micromoles of diphospyridinenucleotide and 0.5 ml. of enzyme extract containing beta-hydroxysteroid dehydrogenase prepared as in Example 1 were added. The mixture was incubated for 20 minutes at 25° C. The products were extracted with three 5 ml. portions of ethyl acetate. The combined extracts were dried over anhydrous sodium sulfate and reduced to dryness in vacuo. The residue was redissolved in methanol. A small aliquot was used for paper chromatography and the product demonstrated to be androst-4-ene-3,17-dione; no unchanged starting material being detectable. The amount of reduced diphospyridinenucleotide as measured spectrophotometrically indicated a quantitative convension of the testosterone to androst-4-ene-3,17-dione.

The amount of steroid may be significantly increased in this system by adding up to 20% methanol which does not impair the enzyme activity.

Example 3.—Androst-5-ene-3$\beta$,17$\beta$-diol was substituted for testosterone in the procedure of Example 2 and under conditions similar to Example 2, conversion of androst-5-ene-3$\beta$,17$\beta$-diol to androst-4-ene-3,17-dione was carried out.

Example 4.—Dehydroepiandrosterone was substituted for testosterone in the procedure of Example 2 and under conditions similar to Example 2, conversion of dehydroepiandrosterone to androst-4-ene-3,17-dione was carried out.

Example 5.—17$\beta$-estradiol was substituted for testosterone in the procedure of Example 2 and under conditions similar to Example 2, conversion of 17$\beta$-estradiol to estrone was carried out.

*Example 6.*—Dehydroepiandrosterone was substituted for testosterone in the procedure of Example 2 and under conditions similar to those of Example 2 the mixture was incubated for a short period of time thereby effecting a conversion of dehydroepiandrosterone to androst-4-ene-3,17-dione, the pH of the mixture was then reduced to 6.5 and the mixture was incubated for a further period. By this two-stage operation, analysis of the products showed substantially quantitative conversion of the dehydroepiandrosterone to testosterone.

*Example 7.*—Androst-4-ene-3,17-dione was substituted for testosterone in the procedure of Example 2 and under conditions similar to Example 2, except for the lowering of the pH to 6.5, androst-4-ene-3,17-dione was converted to testosterone.

*Example 8.*—Estrone was substituted for testosterone in the procedure of Example 2 and under conditions similar to Example 2, except for the lowering of the pH to 6.5 estrone was converted to 17β-estradiol.

*Example 9.*—Pregn-5-ene-3β-ol-20-one was substituted for testosterone in the procedure of Example 2 and under conditions similar to Example 2, pregn-5-ene-3β-ol-20-one was converted to progesterone.

*Example 10.*—17α - methylandrost-5-ene-3β,17β - diol was substituted for testosterone in the procedure of Example 2 and under conditions similar to Example 2, 17α-methylandrost-5-ene-3β,17β-diol was converted to methyltestosterone.

*Example 11.*—11β-hydroxytestosterone was substituted for testosterone in the procedure of Example 2 and under conditions similar to Example 2, 11β-hydroxytestosterone was converted to 11β-hydroxyandrost-4-ene-3,17-dione.

It will be understood that the action of the enzyme "beta hydroxysteroid dehydrogenase" in the foregoing reactions is independent of whether the enzyme was induced by growing the Pseudomonas cells in the presence of testosterone, dehydroepiandrosterone, androst-4-ene-3,17 dione, or other related 3,17 beta hydroxy or keto steroids.

While the enzyme extracted from the Pseudomonas cells and adapted in the manner described are selective in their action upon the 3 beta and 17 beta hydroxy groups and upon the 3,17 keto groups, it is possible by isolating and adapting other Pseudomonas strains, to produce enzymes specific in their attack to other groups and at other positions upon the steroid nucleus. Thus, adapted enzymes may be produced which are capable of selectively utilizing estrogens, or of selectively utilizing andrenal cortical steroids. The field of steroid chemistry is thereby considerably advanced by the discovery of the selectivity of the adapted enzymes.

The advantages of the invention described above are evident. The use of the particular enzyme affords a high degree of specificity of reaction. Rapid conversions may be accomplished with substantially quantitative yield. The elimination of side reactions facilitates recovery of the end product. Reaction conditions are mild, involving neither extremes of hydrogen ion concentration or temperature. Thus, by the use of the particular enzyme, a stereochemically oriented reaction can be readily performed at a selected point in the molecule.

It will be appreciated from a reading of the foregoing specification that the invention herein described is susceptible of various changes and modifications without departing from the spirit and scope thereof.

What is claimed is:

1. A process for the selective oxido-reduction of b-hydroxy and ketosteroids of the class consisting of estrane, androstane and pregnane, and containing 3-beta-groups, 17-beta-groups, and 3-beta, 17-beta groups, comprising subjecting said steroids to the action of beta-hydroxysteroid dehydrogenase in a medium having a pH range of from about 5.5 to about 9.0 at about room temperature in the presence of a hydrogen carrier to convert the said 3 and 17-beta-groups to keto groups at the higher pH and to hydroxy groups at the lower pH.

2. A process for the selective oxido-reduction of b-hydroxy and ketosteroids of the class consisting of estrane, androstane and pregnane, and containing 3-beta-groups, 17-beta-groups, and 3-beta, 17-beta-groups, comprising subjecting said steroids in the presence of a hydrogen carrier to the action of beta-hydroxysteroid dehydrogenase isolated from a Pseudomonas characterized by its ability to grow on a steroid as a sole source of carbon, the reaction occurring in the presence of a medium having a pH in the range of about 5.5 to about 9.0 and at about room temperature to convert the said 3- and 17-beta-groups to keto groups at the highest pH and to hydroxy groups at the lower pH.

3. A process comprising subjecting a steroid selected from the class consisting of estrane, andostrane and pregnane and consisting of 3-beta-hydroxysteroids, 17-beta-hydroxysteroids, and 3-beta, 17-beta hydroxysteroids, to the action of beta-hydroxysteroid dehydrogenase in an alkaline medium in the presence of a hydrogen acceptor to selectively oxidize said beta-hydroxy groups, and recovering the resulting oxidized steroid.

4. A process comprising subjecting a steroid selected from the class consisting of estrane, androstane and pregnane and having 3-keto-steroids, 17-keto-steroids, and 3,17 keto-steroids, to the action of beta-hydroxysteroid dehydrogenase in an acid medium in the presence of a hydrogen donor to selectively reduce said keto-groups to beta hydroxy groups, and recovering the resulting beta hydroxy steroid.

5. A process for the selective oxidation of a 3-beta-hydroxysteroid of the class consisting of estrane, androstane and pregnane in the presence of an unprotected hydroxyl group on the steroid nucleus in at least one of the positions 1, 2, 4, 5, 6, 7, 8, 9, 10, 11, 12, 13, 14, 15, 16 and 17 alpha, comprising subjecting said steroid to the action of beta-hydroxysteroid dehydrogenase in the presence of a hydrogen acceptor in an alkaline medium to selectively oxidize said 3-beta-hydroxyl group to a keto group.

6. A process for the selective oxidation of a 17-beta-hydroxysteroid of the class consisting of estrane, androstane, and pregnane in the presence of an unprotected hydroxyl group on the steroid nucleus in at least one of the positions 1, 2, 3 alpha, 4, 5, 6, 7, 8, 9, 10, 11, 12, 13, 14, 15, and 16, comprising subjecting said steroid to the action of beta-hydroxysteroid dehydrogenase in the presence of a hydrogen acceptor in an alkaline medium to selectively oxidize the 17-beta-hydroxy group to a keto group.

7. A process for the selective oxidation of the 3-beta and 17-beta hydroxyl groups of a 3 beta, 17 beta hydroxy steroid of the class consisting of estrane, androstane and pregnane in the presence of at least one other hydroxyl group on the steroid nucleus comprising subjecting said steroid to the action of beta-hydroxysteroid dehydrogenase in the presence of a hydrogen acceptor in an alkaline medium to selectively oxidize the 3-beta and 17-beta hydroxyl groups to keto groups.

8. A process for the selective reduction of the 17-keto group of a 17-keto steroid in the presence of other keto groups on the steroid of the class consisting of estrane, androstane and pregnane nucleus comprising subjecting said steroid to the action of beta-hydroxysteroid dehydrogenase in the presence of a hydrogen carrier in an acid medium to selectively reduce the keto group to a 17-beta hydroxy group.

9. A process for the selective conversion of dehydroepiandrosterone to testosterone comprising subjecting dehydroepiandrosterone to the action of beta-hydroxysteroid dehydrogenase in an aqueous medium containing a catalytic amount of diphosphopyridine nucleotide and an oxidation-reduction dye at a temperature between 20° C. and 35° C. at approximately pH 9 and to produce androst- 4-ene-3,17-dione, then lowering the pH to approximately pH 6 to effect the selective reduction of the 17 keto group of the androst-4-ene-3,17-dione to a 17-beta hydroxyl group.

10. A process for the oxidation of 5-pregnene-3-beta-ol-20-one to progesterone comprising subjecting 5-pregnene-3-beta-ol-20-one to the action of beta-hydroxysteroid dehydrogenase in the presence of a hydrogen acceptor in an alkaline medium.

11. A process for the reduction of estrone to 17 beta estradiol comprising subjecting estrone to the action of beta-hydroxysteroid dehydrogenase in the presence of a hydrogen donor in an acid medium.

12. A process for the oxidation of 17 beta estradiol to estrone comprising subjecting 17 beta estradiol to the action of beta-hydroxysteroid dehydrogenase in the presence of a hydrogen acceptor in an alkaline medium.

13. A process for the selective oxidation of 17 alpha methyl androst-5-ene-3 beta, 17 beta-diol to 17 alpha methyl testrosterone comprising subjecting 17 alpha methyl androst-5-ene-3 beta, 17 beta-diol to the action of beta-hydroxysteroid dehydrogenase in alkaline medium in the presence of a hydrogen acceptor.

14. A process for the selective oxidation of dehydroepiandrosterone to androst-4-ene-3,17 dione comprising subjecting dehydroepiandrosterone to the action of beta-hydroxysteroid dehydrogenase in alkaline medium in the presence of a hydrogen acceptor.

15. A process for the selective reduction of androst-4-ene-3,17 dione to testosterone comprising subjecting androst-4-ene-3,17 dione to the action of beta-hydroxysteroid dehydrogenase in acid medium in the presence of a hydrogen donor.

16. A process for the selective oxidation of dehydroepiandrosterone to androst-4-ene-3,17 dione comprising incubating a medium containing dehydroepiandrosterone, beta hydroxysteroid dehydrogenase, and diphosphopyridine nucleotide at a pH of above about 8.3 for about twenty minutes at a temperature of about 25° C., and isolating androst-4-ene-3,17 dione from the resulting reaction mass.

17. The process for the selective conversion of steroids selected from the class consisting of estrane, androstane and pregnane containing 3-beta-ol-5-ene grouping consisting of 3-beta hydroxysteroids, 17-beta hydroxysteroids and 3-beta,17-beta hydroxysteroids to the action of beta hydroxysteroid dehydrogenase in an alkaline medium in the presence of a hydrogen carrier to selectively oxidize said beta hydroxy groups to keto groups, acidifying the medium and subjecting the oxidized product to the action of the beta hydroxysteroid dehydrogenase to selectively reduce said keto groups to beta hydroxy groups, and recovering the resulting beta hydroxysteroid.

References Cited in the file of this patent

UNITED STATES PATENTS 2,341,110     Mamoli _____ Feb. 8, 1944

OTHER REFERENCES

Santer et al.: Jour. Bio-Chem., vol. 198, September 1952, pages 397–404.

Talalay et al.: Nature, vol. 170, pages 620–621, October 11, 1952.